(12) United States Patent
Mao et al.

(10) Patent No.: US 10,084,367 B2
(45) Date of Patent: Sep. 25, 2018

(54) VIBRATION MOTOR

(71) Applicants: Lubin Mao, Shenzhen (CN); Wenli Wang, Shenzhen (CN); Hongxing Wang, Shenzhen (CN); Fei Hou, Shenzhen (CN)

(72) Inventors: Lubin Mao, Shenzhen (CN); Wenli Wang, Shenzhen (CN); Hongxing Wang, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 273 days.

(21) Appl. No.: 15/256,819

(22) Filed: Sep. 6, 2016

(65) Prior Publication Data

US 2017/0117793 A1 Apr. 27, 2017

(30) Foreign Application Priority Data

Oct. 23, 2015 (CN) .................... 2015 2 0829388 U

(51) Int. Cl.
*H02K 33/16* (2006.01)
*H02K 99/00* (2014.01)

(52) U.S. Cl.
CPC ............. *H02K 99/20* (2016.11); *H02K 33/16* (2013.01)

(58) Field of Classification Search
CPC ..................................................... H02K 33/16
USPC ..................................................... 310/15, 36
See application file for complete search history.

(56) References Cited

U.S. PATENT DOCUMENTS

| | | | | | |
|---|---|---|---|---|---|
| 6,098,288 | A * | 8/2000 | Miyagawa | ............. | H02K 33/16 30/210 |
| 6,933,630 | B2 * | 8/2005 | Kraus | ..................... | B26B 19/28 30/43.7 |
| 7,355,305 | B2 * | 4/2008 | Nakamura | ............. | H02K 33/06 310/12.03 |
| 7,755,227 | B2 * | 7/2010 | Hirashima | ............. | H02K 33/16 310/36 |
| 7,825,903 | B2 * | 11/2010 | Anastas | ................... | G06F 3/016 178/18.07 |
| 8,148,856 | B2 * | 4/2012 | Bataille | .................. | H02K 35/02 290/1 R |
| 8,242,642 | B2 * | 8/2012 | Odajima | ................ | H02K 33/16 310/15 |
| 8,334,624 | B2 * | 12/2012 | Dong | ..................... | H02K 33/16 310/13 |
| 8,456,042 | B2 * | 6/2013 | Dong | ..................... | H02K 33/16 310/15 |

(Continued)

*Primary Examiner* — Alexander Talpalatski
(74) *Attorney, Agent, or Firm* — Na Xu; IPro, PLLC

(57) ABSTRACT

A vibration motor is disclosed. The vibration motor includes a housing having a bottom wall and a sidewall extending from the bottom wall; a cover engaging with the housing for forming a receiving space; a first vibration system suspended by a first elastic member in the receiving space; a second vibration system suspended by a second elastic member in the receiving space; a first restricting hole penetrating the first vibration system; a second restricting hole penetrating the second vibration system; a channel formed cooperatively by the first restricting hole and the second restricting hole; a restricting block having one end fixed to the cover, another end fixed to the bottom wall, and a middle portion at least partially received in the channel.

6 Claims, 2 Drawing Sheets

(56) References Cited

U.S. PATENT DOCUMENTS

| | | | | |
|---|---|---|---|---|
| 8,624,450 B2* | 1/2014 | Dong | ............... | H02K 33/16 |
| | | | | 310/15 |
| 8,648,502 B2* | 2/2014 | Park | ............... | H02K 33/16 |
| | | | | 310/15 |
| 8,878,401 B2* | 11/2014 | Lee | ............... | H02K 33/16 |
| | | | | 310/15 |
| 9,024,489 B2* | 5/2015 | Akanuma | ............... | H02K 33/16 |
| | | | | 310/15 |
| 9,304,589 B2* | 4/2016 | Sawaguchi | ............... | G06F 3/041 |
| 9,306,429 B2* | 4/2016 | Akanuma | ............... | H02K 5/24 |
| 2009/0267423 A1* | 10/2009 | Kajiwara | ............... | H02K 33/02 |
| | | | | 310/36 |
| 2011/0266892 A1* | 11/2011 | Wauke | ............... | B06B 1/045 |
| | | | | 310/25 |
| 2012/0049660 A1* | 3/2012 | Park | ............... | B06B 1/045 |
| | | | | 310/25 |
| 2013/0169072 A1* | 7/2013 | Oh | ............... | B06B 1/045 |
| | | | | 310/36 |
| 2013/0221767 A1* | 8/2013 | Akanuma | ............... | H02K 33/02 |
| | | | | 310/15 |

\* cited by examiner

VIBRATION MOTOR

FIELD OF THE INVENTION

The present disclosure is related to vibration motors, specifically related to a vibration motor for portable consumer electronic products.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

A vibration motor will be drooped down during working, and will further fail because of the drop. For protecting the vibration motor, vibration motors of related arts usually use blocks for preventing the motor from being damaged.

A related vibration motor includes a housing, a vibration unit accommodated in the housing suspended by elastic members, and blocks for protecting the vibration unit. The vibration unit further includes a weight and a restricting hole formed in the weight. The block includes a fastening portion located between the vibration unit and the housing, and a protrusion received in the restricting hole. Along a vibration direction of the vibration unit, a distance between the vibration unit and the protrusion of the block does not exceed the maximum deformation of the elastic member. The block is positioned on the housing by welding. Due to the small size of the block, welding area on the block is so limited that the block cannot be firmly positioned to the housing.

Therefore, an improved vibration motor which can overcome the problems mentioned above is accordingly desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
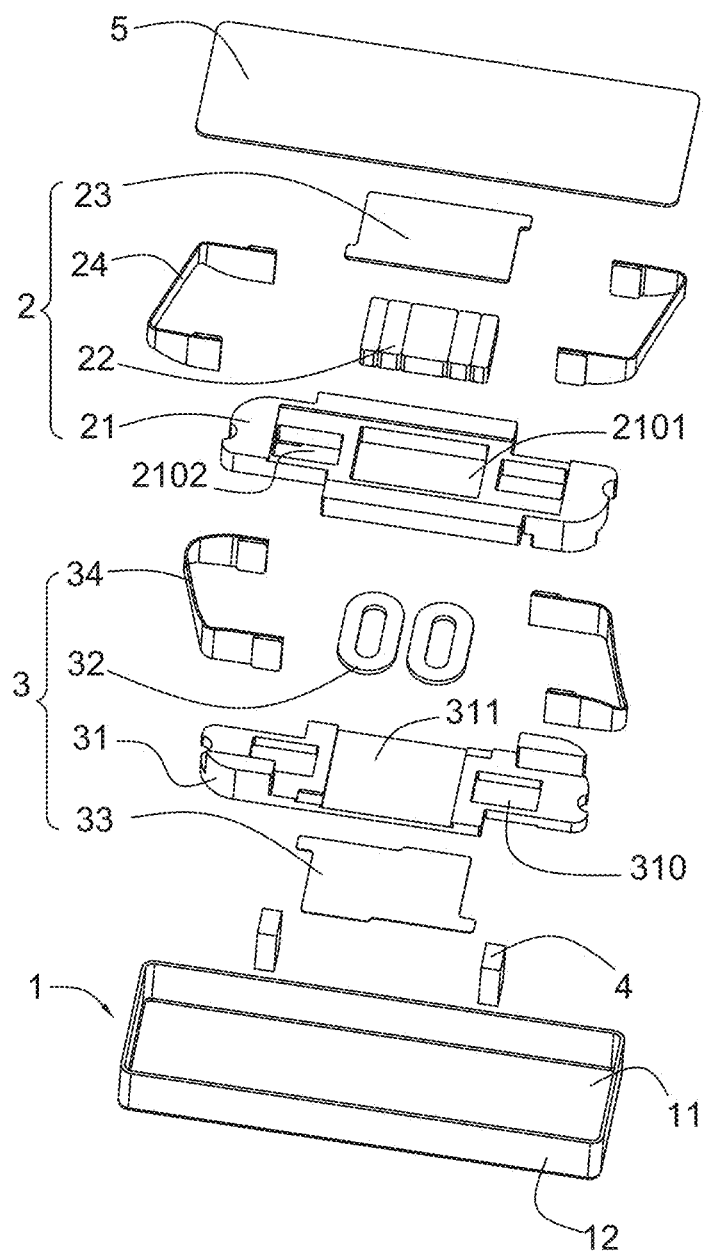
FIG. 1 is an isometric and exploded view of a vibration motor in accordance with an exemplary embodiment of the present disclosure.
Figure 2:
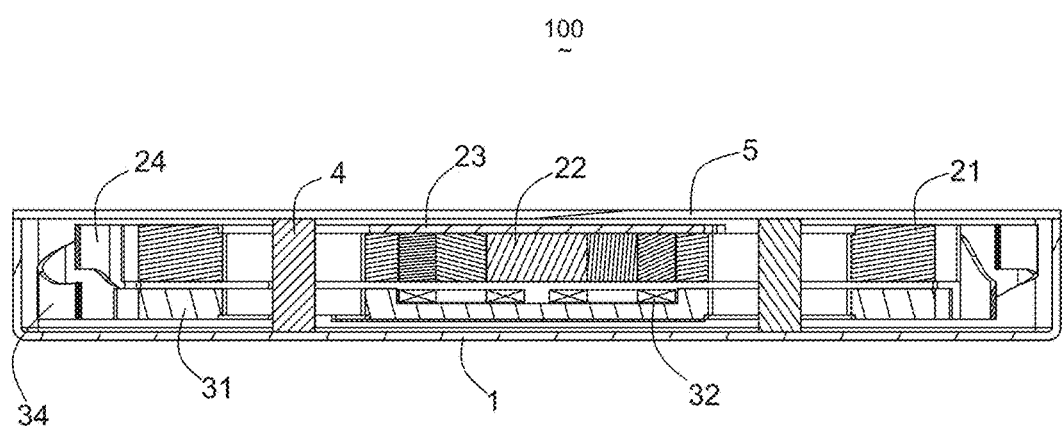
FIG. 2 is a cross-sectional view of the vibration motor in FIG. 1.

Referring to FIGS. 1-2, a vibration motor 100 in accordance with an exemplary embodiment of the present disclosure includes a housing having a receiving space, a cover 5 engaging with the housing 1, a first vibration system 2 received in the receiving space and at least including a magnet 22, and a second vibration system 3 also received in the receiving space and at least including a coil 32. The magnet 22 and the coil 32 are arranged to be opposed to each other and form a gap therebetween. The interaction between the coil and the magnet forces the first vibration system and the second vibration system to vibrate in the housing.

The housing 1 includes a bottom wall 11 and a sidewall 12 extending perpendicularly from the bottom wall 11. The cover 5 engages with the sidewall 12 for forming a protection together with the housing 1.

The vibration motor 100 further includes a pair of first elastic member 24 and a pair of second elastic member 34. The first vibration system 2 is suspended in the receiving space of the housing 1 by the first elastic members 24, and the second vibration system 3 is suspended in the receiving space of the housing 1 by the second elastic members 34.

The first vibration system 2 includes a first weight 21 having a receiving hole 2101 for accommodating the magnet 22. The receiving hole 2101 penetrates the first weight 21 along a direction perpendicularly to a vibration direction of the first vibration system 2. In the embodiment, 5 magnets 22 are arranged in the receiving hole 2101.

The first vibration system 2 further includes a first pole plate 23 attached to the first weight 21 on a surface adjacent to the cover 5 and covering the magnet 22 for conducting magnetic flux.

The second vibration system 3 includes a second weight 31 having a receiving slot 311 for receiving the coil 32. In the embodiment, 2 coils 32 are positioned in the receiving slot 311.

The second vibration system 3 further includes a second pole plate 33 attached to the second weight on a surface adjacent to the bottom wall 11 of the housing 1. A projection along a direction perpendicular to the vibration direction overlaps the coils 22.

Each of the first elastic members 24 has one end fixed to the housing and another end fixed to the first weight 21. Each of the second elastic members 34 has one end fixed to the second weight 31 and another end fixed to the housing 1. The first and second elastic members are used for suspending the vibration systems in the receiving space and providing the vibration systems with elastic restore force.

The first weight 21 forms a first restricting hole 2102 penetrating the first weight along direction perpendicular to the vibration direction. In this embodiment, 2 restricting holes are provided and arranged at two sides of the receiving hole 2101. The second weight 31 forms a second restricting hole 310 penetrating the second weight 31 along a direction perpendicular to the vibration direction. Again, 2 second restricting holes 310 are provided and arranged at two sides of the receiving slot 311. At the same side, a projection of the first restricting hole 2102 along a direction perpendicular to the vibration direction at least partially overlaps a projection of the second restricting hole 310 along the same direction. The first restricting hole and the second restricting hole cooperatively form a channel. The vibration motor 1 further includes a restricting block 4 having one end connecting to the cover 5, another end connecting the bottom wall, and a middle portion at least partially receiving in the channel. Due to the restricting block 4, the amplitude of the first vibration system and the amplitude of the second vibration system are restricted in a predetermined range. In addition, the restricting block 4 is connected to the cover and at the same time connected to the bottom wall, which protects the vibration motor from damages caused by dropping down.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor vibrating along a vibration direction, including:
    a housing with a receiving space, the housing including a bottom wall and a sidewall extending perpendicularly from the bottom wall;
    a cover engaging with the housing;
    a first vibration system in the receiving space adjacent to the cover, the first vibration system including a first weight and a magnet assembled with the first weight;
    a second vibration system in the receiving space and opposed to the first vibration system, the second vibration system located adjacent to the bottom wall, and including a second weight and a coil positioned by the second weight;
    a first restricting hole penetrating the first weight along a direction perpendicular to the vibration direction, the first restricting hole defining a first projection along a direction perpendicular to the vibration direction;
    a second restricting hole penetrating the second weight along a direction perpendicular to the vibration direction, the second restricting hole defining a second projection along a direction perpendicular to the vibration direction, the second projection at least partially overlapping the first projection;
    a restricting block having a part received in the first and second restricting holes, and including one end connecting to the cover and another end connecting to the bottom wall.

2. The vibration motor as described in claim 1, wherein the first weight includes a receiving hole for accommodating the magnet, and two first restricting holes are arranged at two sides of the receiving hole.

3. The vibration motor as described in claim 2, wherein the second weight includes a receiving slot for accommodating the coil, and two second restricting holes are arranged at two sides of the receiving slot.

4. The vibration motor as described in claim 3, wherein the first vibration system further includes a first elastic member having one end fixed to the housing and another end fixed to the first weight.

5. The vibration motor as described in claim 4, wherein the second vibration system further includes a second elastic member having one end fixed to the housing and another end fixed to the second weight.

6. A vibration motor, comprising:
    a housing having a bottom wall and a sidewall extending from the bottom wall;
    a cover engaging with the housing for forming a receiving space;
    a first vibration system suspended by a first elastic member in the receiving space;
    a second vibration system suspended by a second elastic member in the receiving space;
    a first restricting hole penetrating the first vibration system;
    a second restricting hole penetrating the second vibration system;
    a channel formed cooperatively by the first restricting hole and the second restricting hole;
    a restricting block having one end fixed to the cover, another end fixed to the bottom wall, and a middle portion at least partially received in the channel.

* * * * *